United States Patent Office 3,702,876
Patented Nov. 14, 1972

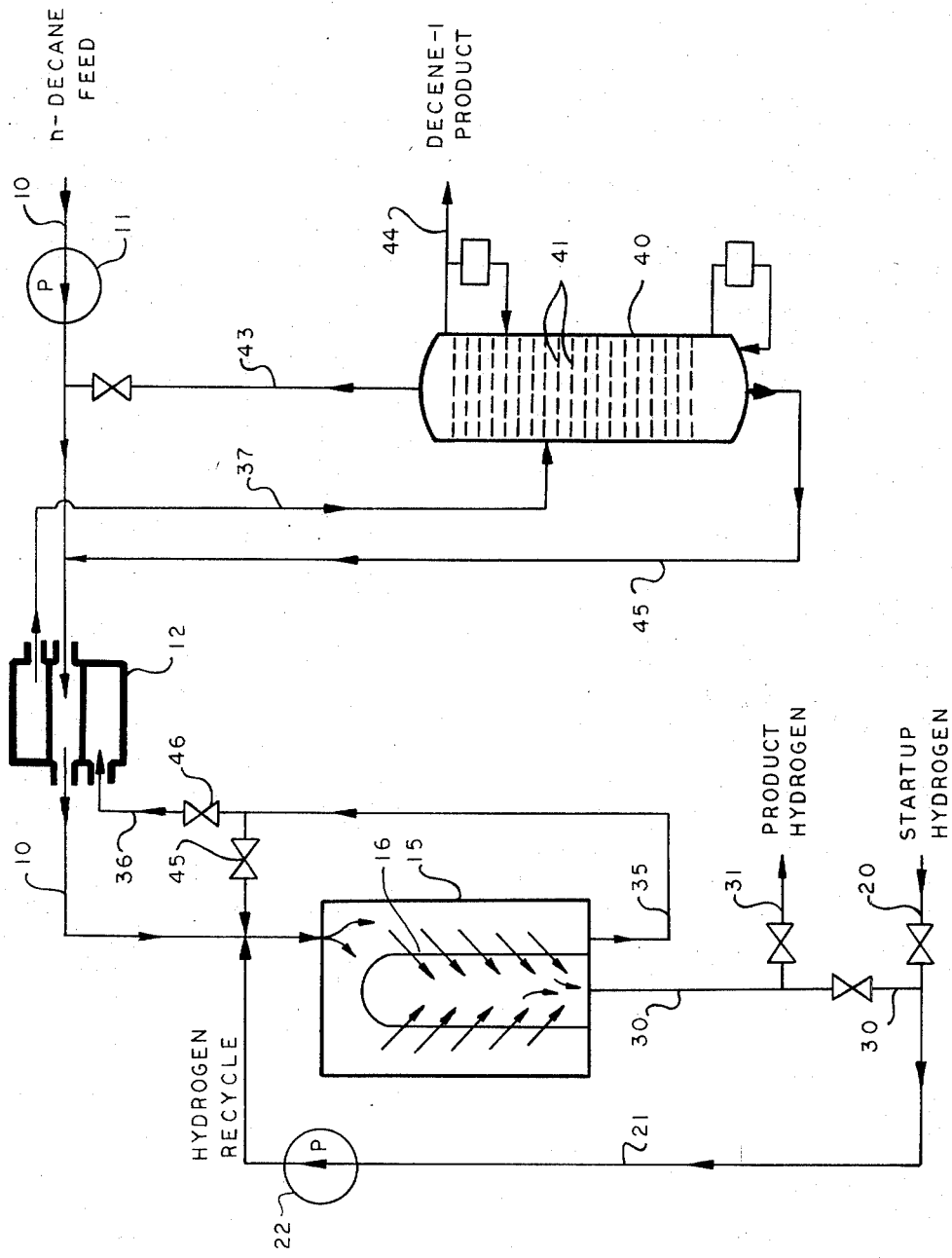

3,702,876
CATALYTIC CONVERSION OF ALKANES AND OLEFINS TO A PRESELECTED OLEFIN ISOMER
Bernard J. Wood, Santa Clara, Calif., assignor to Stanford Research Institute, Menlo Park, Calif.
Continuation-in-part of application Ser. No. 25,498, Mar. 30, 1970. This application June 9, 1971, Ser. No. 151,311
Int. Cl. C07c *5/18, 5/22*
U.S. Cl. 260—683.2     7 Claims

ABSTRACT OF THE DISCLOSURE

A process for the catalytic conversion of $C_4$ and higher alkanes and olefins to a preselected olefin isomer of the same carbon skeletal structure, the process comprising passing a vaporous mixture of the hydrocarbon feed and hydrogen at elevated temperatures through a reaction zone over a palladium catalyst while maintaining the hydrogen content of said vaporous mixture at a relatively constant level as it passes through the reaction zone, the catalyst having been pretreated by exposure to the desired olefin at elevated temperatures in the presence of hydrogen to adsorb the olefin on the catalyst surfaces.

RELATED APPLICATIONS

This application is a continuation-in-part of copending application, Ser. No. 25,498, filed Mar. 30, 1970, now abandoned.

BACKGROUND OF THE INVENTION

In the great majority of known processes for dehydrogenating $C_4$ and higher alkanes to olefins, the product stream contains a plurality of isomers, each of which is present in substantial amounts. The separation of such a stream into its respective components is an expensive and time-consuming procedure, and it would be desirable if an economically feasible method were available for dehydrogenating selected alkanes to a single preestablished olefin product with little or no accompanying formation of other olefin isomers. The process of the present invention is well adapted to fill this need. It also provides a method whereby an olefin isomer of a predetermined structure can be obtained by isomerization from different olefin isomers of the same carbon skeletal structure.

SUMMARY OF THE INVENTION

It has been discovered that $C_4$ and higher hydrocarbons of the class consisting of alkanes and olefins can be converted by dehydrogenation or isomerization to any desired olefin isomer having the same carbon skeletal structure as the feed hydrocarbon, by passing a vaporous mixture of said hydrocarbon and hydrogen, at elevated temperatures, over a palladium catalyst on which the said olefin isomer has been adsorbed by pretreatment, while maintaining the hydrogen content of the gases passing over the catalyst at a relatively constant level. Thus, when using an alkane feed the process is one of dehydrogenation, and hydrogen is withdrawn from the reaction zone at essentially the same rate as it is released by dehydrogenation. On the other hand, when using an olefin feed where the process is one of isomerization, care is taken to prevent undue loss of hydrogen from the reaction zone by diffusion through the catalyst, or otherwise.

The pretreatment of the catalyst, whereby the desired olefin isomer product becomes adsorbed thereon, is carried out by exposing the heated catalyst, in a clean condition, to vapors of the said isomer product in the presence of hydrogen.

Any one of a wide variety of straight or branched chain alkanes containing at least 4 carbon atoms, and preferably from about 4 to 20 or more carbon atoms, can be employed as the feed stock to be dehydrogenated to the desired olefin product of the same carbon skeletal structure. Thus, trans-2-butene, cis-2-butene or 1-butene can be produced from n-butane, and isobutene can be produced from isobutane; 1-pentene or cis- or trans-2-pentene can be produced from n-pentane, and 2-methylbutene-1 can be produced from isopentane. Similarly, preselected $C_6$ olefin isomers of the same carbon skeletal structure can be produced from n-hexane, 2-methylpentane, 3-methylpentane, 2,2-dimethylbutane and 2,3-dimethylbutane, and $C_7$ olefins can be produced from n-heptane, 2-methylhexane, 3-methylhexane, 2,2-dimethylpentane, 2,3-dimethylpentane, 2,4-dimethylpentane, 3,3-dimethylpentane, 3-ethylpentane and 2,2,3-trimethylbutane. Other preselected olefin isomers of the same carbon skeletal structure can be produced from the various straight and branched chain octanes, nonanes, decanes, undecanes, dodecanes, tridecanes, tetradecanes, pentadecanes, hexadecanes, heptadecanes, octadecanes, nonadecanes and eiscosanes, for example.

When using an olefinic feed stock in the process hereof, there can be employed any one or more isomers of the same carbon skeletal structure as the olefin isomer to be formed by isomerization. Thus, 1-butene can be formed from trans-2-butene or cis-2-butene, or from a mixture of the said cis- and trans-isomers. Similarly, cis-2-butene can be formed from 1-butene and/or trans-2-butene. On the other hand, isobutene, with its particular carbon skeletal structure, cannot be converted to any other butene isomer. Other olefin isomers such, for example, as those mentioned or referred to in the preceding paragraph, can also be employed as feeds.

It also forms a feature of this invention to employ mixtures containing both an alkane and one or more olefin isomers, all of the same carbon skeletal structure, as the feed to the pretreated catalyst, along with hydrogen. One such operation is described below in Example 2, and all the several feed components are converted in some measure to the preselected olefin isomer which has been laid down on the catalyst surface in the pretreatment step.

The term "palladium," as employed herein to describe the catalyst employed in carrying out the process of the present invention, includes palladium catalysts of the metal type wherein the metal is unsupported and is made up of pure palladium or of a palladium alloy containing more than about 40 atom percent of palladium, as taught in the art. Thus, the palladium can be alloyed with silver, gold or platinum, with still other metals being added on occasion to add strength or for other purposes. For example, there is commonly employed an alloy of palladium with about 25 atom percent of silver. Palladium catalysts of this character have the capacity to take up hydrogen readily, the hydrogen diffusing rapidly and selectively through the metal.

In carrying out the pretreatment of the palaldium catalyst, whereby the desired olefin isomer becomes adsorbed on the catalyst surface in the nature of a template, the catalyst is first placed in a "clean" condition. This can be accomplished, for example, by heating the catalyst in vacuum at 350° to 450° C. for one or more hours, with the hot catalyst then being exposed to air at ambient pressures for a few minutes to remove any residual organic materials which may be present. Following this, the system can be evacuated and it is ready for the pretreatment with the olefin. This can be accomplished by exposing the catalyst surfaces to vapors of the preselected olefin isomer in the presence of hydrogen. The treatment is carried out at elevated catalyst temperatures high enough to induce the formation of the desired olefin template on the exposed catalyst surfaces. Such temperatures should be at least about 100° C., and preferably temperatures of from about 250° to 400° C., or more, are used.

The desired result can be obtained by allowing the heated catalyst surface to come into contact first with the hydrogen and then with the olefin, or with a mixture of the olefin and hydrogen. In another method, one surface of a metallic palladium catalyst (which is later to be exposed to the feed stock) can first be treated with the olefin at appropriate temperatures, as noted above, with hydrogen thereafter being supplied to said surface by diffusion through the metal as the other surface of the catalyst is exposed to hydrogen gases. All these treatments can be conducted at ambient, subatmospheric or superatmospheric pressures.

The foregoing catalyst pretreatment step can be accomplished within a few seconds, if desired, though preferably it is carried out over a period of several minutes. Thus, in a typical operation the clean catalyst at 330° C. is first exposed for several minutes to hydrogen at 300 to 500 mm. Hg., following which the olefin is brought into the hydrogen environment at partial pressures of about 5 to 100 mm. Hg. The system is then again allowed to stand for several minutes that it may come to equilibrium, at which point the pretreatment is complete.

Following the catalyst pretreating step, the alkane or olefin feed is passed in the vapor phase, along with hydrogen, over the catalyst which is maintained at temperatures within a range of from about 125° to 450° C. Within these limits, the temperatures employed should be high enough to maintain the feed hydrocarbon in the gaseous state, and not so high as to induce significant decomposition of the feed or product gases in the reaction zone. Activity of the catalyst increases with temperature, and for any given system routine trials should be made at various temperatures to ascertain the optimum temperatures to be employed.

As noted above, the alkane and/or olefin gases employed as feed are always supplied to the heated, pretreated catalyst along with hydrogen, the proportions of reactant and hydrogen being such that the conditions which are required for dehydrogenation or isomerization are maintained over the catalyst. More specifically, when using an alkane feed there is preferably supplied to the reaction zone a mixture containing at least 0.5 mole of hydrogen per mole of alkane, and the optimum proportion of hydrogen may well be from 1 to 10 or more moles, per mole of the alkane, depending on the thermodynamics of a particular system. When using an olefin (to be isomerized) as the feed, there should be employed not more than about 1 mole, and preferably from about 0.2 to 0.4 mole, of hydrogen per mole of the olefin. In all cases, the optimum hydrogen/hydrocarbon mole ratio can routinely be determined by one skilled in the art in the light of the present teachings.

The rate at which the mixed hydrogen and hydrocarbon feed gases are supplied over the catalyst in the reaction zone is not critical inasmuch as some reaction will take place even when the throughput rate is set at a high level. Similarly, the use of a low or even static feed rate, wherein the alkane or olefin feed material has a relatively long residence time over the catalyst, is not harmful inasmuch as side reactions and those of product decomposition are essentially absent in the present system. In most operations it has been found that good results can be obtained by the use of residence times in the reaction zone of from about 0.05 second to 1 or more minutes. These times assume that the geometry of the reactor is such that the entrant feed gases are efficiently brought into contact with the pretreated palladium catalyst surfaces in the reaction zone.

The feed gases can be passed over the catalyst under ambient, subatmospheric or superatmospheric conditions of pressure. The use of moderately elevated pressures is generally preferred, particularly when using an alkane feed and a catalyst of the metallic type through which hydrogen is withdrawn from the reaction zone to maintain the partial pressure of hydrogen therein at a relatively constant level.

In those reactions involving dehydrogenation of an alkane to the olefin product, it is necessary that hydrogen be removed from the reaction zone at a rate which corresponds to that at which hydrogen is released at the catalyst surfaces as dehydrogenation occurs. When the catalyst employed is one of the metallic palladium type, the reactor may be so set up that the reactants are brought into contact with one surface of the catalyst at elevated pressures (e.g. 50 to 250 p.s.i.g.), while the area adjacent the other surface of the catalyst is maintained at somewhat lower pressures. In other words, there should be established a substantial pressure drop from one side of the catalyst to the other. For example, when using a tubular metallic catalyst, the latter can be positioned within a reaction zone in such a way that feed gases passing through the reaction zone contact only the outer surfaces of the catalyst tube. With the aid of a pressure differential, pure hydrogen can then be withdrawn by diffusion through the tube wall from the reaction zone into the interior of the tube for transport out of the reactor. Other catalyst-reactor configurations will suggest themselves to those skilled in the art.

When the feed is an olefin to be isomerized, there is no net production of hydrogen. Consequently, care must be taken to make sure that no significant portion of the hydrogen introduced with the feed is lost as the feed gases pass over the catalyst and out the reaction zone. Thus, with the reaction being conducted over a hydrogen-porous metallic catalyst, the reaction conditions should be such that there is little, if any, pressure drop across the catalyst wall.

In carrying out the process of the present invention, it is possible to effect a substantial per-pass conversion of the alkane or olefin feed to the desired olefin isomer as the feed stream is continuously passed over the catalyst. The resulting product stream which is discharged from the reactor can then be worked up so as to recover the olefin product and to recycle the unconverted feed gases, along with necessary hydrogen, to the reactor. In another method of operation, a portion of the reactor effluent may be continuously sent to product recovery, while the balance thereof, is recycled to the reactor along with added quantities of the alkane or olefin feed. In alkane dehydrogenation operations in which hydrogen is withdrawn from the feed gases by diffusion through the catalyst, the net production of hydrogen can be recovered from the system as a valuable product.

To illustrate a typical recycle method of practicing the invention, there is presented in the figure of the accompanying drawing a schematic flow diagram of a unit for converting n-decane to decene-1. In this diagram, preheated n-decane is shown as entering the system through a feed line 10 where it passes through a compressor 11 and then through a heat exchanger 12 before being discharged under superatmospheric pressures into reactor 15. In the reactor the decane passing through the reaction zone comes into contact with the outer surface (appropriately pretreated with hexene-1) of a metallic palladium-silver alloy catalyst having the form of a hollow tube 16, closed at its upper end. As the unit is started up, hydrogen is supplied to the unit through lines 20 and 21, the gases in the latter line being passed through a compressor 22 before entering line 10 for introduction into the reactor 15 along with the decane. Once the reaction is underway, line 20 can be closed off, for the system has a net production of hydrogen and the amount of this gas required in the feed stream can be supplied by way of recycle.

The mixed decane and hydrogen gases in reactor 15 are exposed to the outer surface of the catalyst tube 16 which is maintained at the desired elevated temperatures either by the incoming heated gases, or by an external heater (not shown), or both. A substantial pressure differential is maintained across the catalyst; i.e. the pressures exteriorally of tube 16 are greater than those which prevail within the interior of the tube which is in communication with a hydrogen exit line 30. Due to this pressure differential, hydrogen gases at the outer surface of the tube 16 rapidly diffuse through the catalyst wall and into the interior of the tube for passage out of the reactor through line 30. That portion of the exiting hydrogen gases which represents net hydrogen production is discharged through the line 31, while the balance is recycled via line 21 to the reaction zone.

Gases are discharged from the reaction zone through line 35. A portion of said gas is taken to product recovery through line 36, while the balance is recycled to the reaction zone. The product gases in line 36 pass through heat exchanger 12, where they bring the decane in line 10 to a predetermined temperature. The product gases then pass through line 37 into a distillation column 40. In said column, which is provided with trays 41 of the desired type and number, the hydrogen (along with some decene-1) is taken off at the top of the column through line 43, for return to the reactor through line 10. The decene-1 product is recovered as a sidestream through line 44, while the unconverted n-decane is removed as a bottoms stream and is recycled to the reactor through lines 45 and 10.

Should it not be desired to recycle a substantial volume of the gases in line 35 to the reactor, valves 45 and 46 can be so adjusted as to direct the entire product stream in said line to column 40.

In connection with the above description of the diagram, it should be recognized that the outer surface of the catalyst tube 16 has been subjected to an appropriate pretreatment with decene-1 and hydrogen. Mention may also be made of the fact that a palladium-silver (25%) alloy catalyst tube having a wall thickness of 0.003 inch, has the ability to transfer through the wall 1 s.c.f. $H_2$/hr. for each 0.63 sq. in. of catalyst surface at a pressure differential of 200 p.s.i.g. and a temperature of 800° F The following examples merely illustrate the invention and are not to be construed as limiting.

EXAMPLE 1

In this operation, n-butane is converted to butene-1 in a tubular glass vessel, or reactor tube, provided with a palladium-silver (25%) metallic catalyst. The latter is in the form of a hollow cylinder closed at one end, and having a diameter of 3/8 inch, a wall (or membrane) thickness of 0.01 inch, and a surface area of about 25 square centimeters. The particular apparatus employed is similar to that shown in FIG. 1 of the article, "Dehydrogenation of Cyclohexane on a Hydrogen-Porous Membrane," Journal of Catalysis, 11, 30–34 (1968).

To provide a clean catalyst for pretreatment, the reactor is heated to a temperature of 400° C. for several hours under vacuum. At the end of this period, the system, still at 400° C., is opened to the atmosphere for several minutes in order to burn off any organic components which may still be present on the catalyst. The glass tube and the tubular catalyst membrane are then evacuated to a pressure of less than 1 mm. Hg, following which the reactor and the membrane are closed off from the vacuum pump. The temperature is now reduced to 330° C. and hydrogen is admitted to the reactor externally of the catalyst membrane through which it rapidly diffuses to establish an equilibrium pressure throughout the whole reactor of 600 mm. Hg. After several minutes, butene-1 is admitted to the hydrogen-containing reactor tube, externally of the membrane, at a partial pressure of 10 mm. Hg, following which the system is again allowed to stand for several minutes.

With the catalyst pretreatment step now complete, n-butane is added to the reactor space externally of the catalyst membrane at a partial pressure of 100 mm. Hg. this representing a 6:1 mole ratio of hydrogen to butane. The membrane is now connected to the vacuum pump and pure hydrogen is withdrawn (by diffusion through the membrane) until the supply of hydrogen in the reactor is essentially exhausted, the catalyst being maintained at 330° C. It is found that the partial pressure of n-butane in the system is now approximately 80 mm. Hg. while that of butene-1 is aproximately 20 mm. Hg. This represents a conversion of n-butane to butene-1 of between 10 and 20 percent. Of the total butene present, a total of less than 1 percent is present as cis-2-butene and trans-2-butene.

EXAMPLE 2

In this operation, wherein there is employed the apparatus described in Example 1, mixed feed gases comprising n-butane, butene-1 and cis-2-butene are each converted to trans-2-butene. In carrying out the process, the outer surface of the clean, tubular catalyst is exposed at 330° C. to trans-2-butene at 100 mm. Hg in the absence of hydrogen. After several minutes, hydrogen at 760 mm. Hg is admitted into the interior of the hot catalyst tube. As the hydrogen so admitted diffuses through the wall to the outer surface of the catalyst, a portion of the trans-2-butene present in the reaction zone is converted to n-butane (40 mm. Hg), butene-1 (12 mm. Hg) and cis-2-butene (20 mm. Hg), the partial pressure of the residual trans - 2 - butene being 25 mm. Hg. Essentially all the hydrogen is now withdrawn from the system by connecting a vacuum line to the interior of the catalyst tube, the temperature of the latter being continuously maintained at 330° C. At the end of this hydrogen-withdrawal period, it is found that the following partial pressures prevail in the reaction zone over the catalyst: n-butane, 10 mm. Hg; butene-1, 8 mm. Hg; cis-2-butene, 8 mm. Hg; and trans-2-butene, 70 mm. Hg. This represents a conversion of n-butane to trans-2-butene of 75%, a conversion of butene-1 to trans-2-butene of 33% and a conversion of cis-2-butene to trans-2-butene of 60%.

EXAMPLE 3

In a manner essentially the same as that set forth above in Example 2, the catalyst is pretreated with isobutene, and isobutane is dehydrogenated to isobutene. Here the conversion to said olefin exceeds 50%. No other olefin isomers are formed.

The olefin isomers produced by a practice of this invention are industrial chemicals having a wide variety of uses. Thus, they are useful as solvents, as polymerizing ingredients and as intermediates in forming other organic compounds, they having a chemically reactive double bond.

I claim:

1. A process for the conversion of $C_4$ and higher alkane and olefin hydrocarbon feeds to a preselected olefin isomer of the same carbon skeletal structure as the feed, which comprises passing a vaporous mixture of the hydrocarbon feed and hydrogen at elevated temperatures through a reaction zone over a palladium catalyst, while maintaining the hydrogen content of said mixture at a relatively constant level as it passes through the reaction zone, said catalyst having been pretreated at elevated temperatures with vapors of the said olefin isomer in the presence of hydrogen to adsorb the isomer on the catalyst.

2. The process as recited in claim 1 wherein the hydrocarbon feed is an alkane, wherein the catalyst is one of the metallic palladium alloy type, and wherein the hydrogen content of the vaporous mixture passing through the reaction zone is maintained at a relatively constant level by withdrawing hydrogen from said zone through the catalyst.

3. The process as recited in claim 2 wherein the hydrocarbon feed is n-butane and wherein the isomer adsorbed on the catalyst by pretreatment is one of butene-1, trans-2-butene and cis-2-butene.

4. The process as recited in claim 2 wherein the hydrocarbon feed is isobutane and the isomer adsorbed on the catalyst is isobutene.

5. The process as recited in claim 1 wherein the hydrocarbon feed comprises one or more olefin isomers to be isomerized to the olefin isomer adsorbed on the catalyst by pretreatment.

6. The process as recited in claim 1 wherein the hydrocarbon feed comprises a mixture of an alkane with one or more olefin isomers, all of the same carbon skeletal structure as the olefin isomer adsorbed on the catalyst by pretreatment.

7. The process as recited in claim 6 wherein the alkane is n-butane and the isomers are $C_4$ olefins other than isobutene.

References Cited
UNITED STATES PATENTS

| | | | |
|---|---|---|---|
| 3,151,180 | 9/1964 | Myers | 260—683.3 |
| 3,352,938 | 11/1967 | Plonsker et al. | 260—683.2 |
| 3,352,939 | 11/1967 | Breckhoff et al. | 260—683.2 |
| 3,409,702 | 11/1968 | Plonsker et al. | 260—683.2 |
| 3,433,851 | 3/1969 | Keblys | 260—683.3 |
| 3,433,852 | 3/1969 | Keblys | 260—683.3 |
| 3,450,500 | 6/1969 | Setzer et al. | 260—683.3 |

DELBERT E. GANTZ, Primary Examiner

C. E. SPRESSER, JR., Assistant Examiner

U.S. Cl. X.R.

260—683.3